US007336150B2

(12) United States Patent
Gokcebay et al.

(10) Patent No.: US 7,336,150 B2
(45) Date of Patent: Feb. 26, 2008

(54) LOCKER LOCK WITH MASTER OVERRIDE AND LOW POWER JUMP START

(75) Inventors: Asil T. Gokcebay, Petaluma, CA (US); Yucel K. Keskin, San Jose, CA (US); Robert E. Kearns, San Francisco, CA (US)

(73) Assignee: Security People, Inc., Petaluma, CA (US)

( * ) Notice: Subject to any disclaimer, the term of this patent is extended or adjusted under 35 U.S.C. 154(b) by 440 days.

(21) Appl. No.: 11/084,064

(22) Filed: Mar. 17, 2005

(65) Prior Publication Data

US 2006/0238294 A1 Oct. 26, 2006

(51) Int. Cl.
*G05B 19/00* (2006.01)
*G05B 23/00* (2006.01)

(52) U.S. Cl. ........................ 340/5.54; 340/5.2; 70/432; 70/461; 70/278.1

(58) Field of Classification Search ................. 340/5.2, 340/5.54, 825.31; 70/432, 461, 278.1, 434, 70/441

See application file for complete search history.

(56) References Cited

U.S. PATENT DOCUMENTS

| | | | | |
|---|---|---|---|---|
| 5,886,644 | A | 3/1999 | Keskin et al. | |
| 5,894,277 | A | 4/1999 | Keskin et al. | |
| 6,474,122 | B2 | 11/2002 | Davis | |
| 6,494,067 | B1 * | 12/2002 | Jasper | 70/278.1 |
| 6,655,180 | B2 * | 12/2003 | Gokcebay et al. | 70/432 |
| 2003/0074966 | A1 * | 4/2003 | Fukumura et al. | 73/488 |

* cited by examiner

*Primary Examiner*—Jeffery Hofsass
*Assistant Examiner*—Yong Hang Jiang
(74) *Attorney, Agent, or Firm*—Thomas M. Freiburger

(57) ABSTRACT

An electronic lock device for lockers of similar uses has an input for a user code (keypad or electronic key reader), and a separate input for a manager key. Contacts at the manager key include power jumper contacts, so that when a user is unable to open his assigned locker, whether this is due to a low battery in the lock or failure of the user's key or the user's forgetting a PIN code, the manager key device will open the lock.

15 Claims, 5 Drawing Sheets

FIG. 6
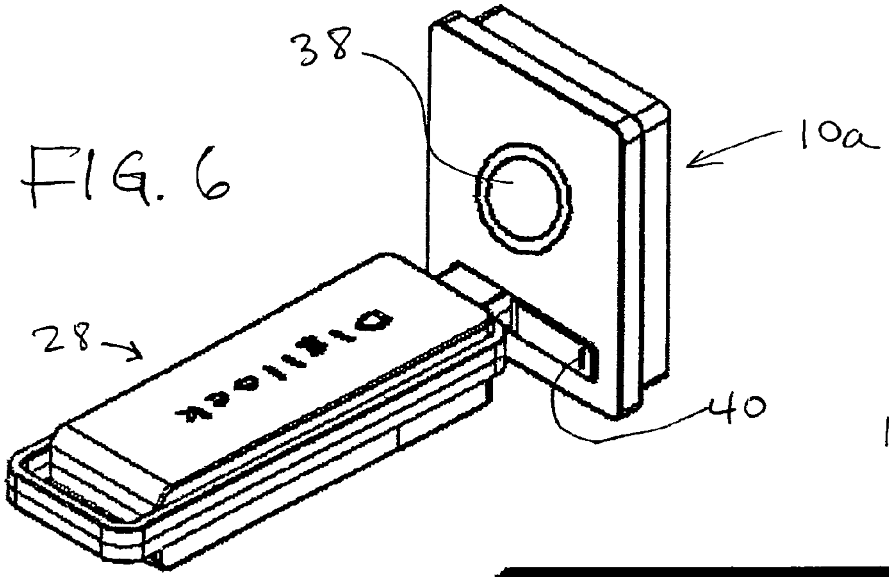
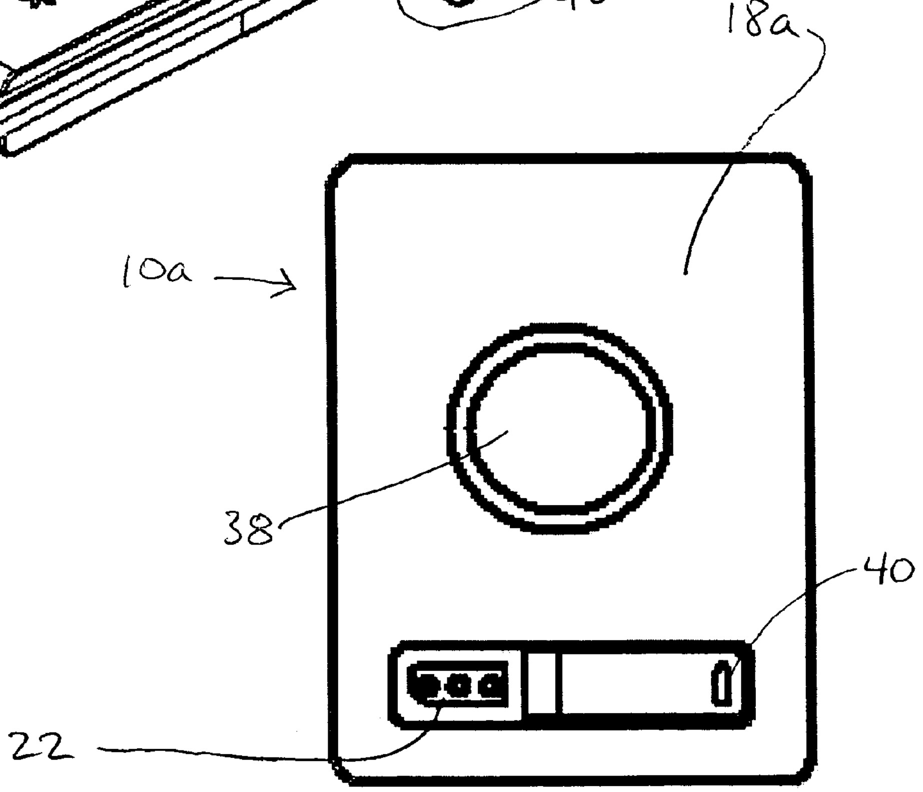
FIG. 5

LOCKER LOCK WITH MASTER OVERRIDE AND LOW POWER JUMP START

BACKGROUND OF THE INVENTION

This invention is concerned with security of lockers, safes, desks, cabinets or other such storage devices assigned for temporary or long-term use. In particular, the invention relates to a lock for such storage situations.

Electro mechanical locks are well known. For example, hotel safes for temporary use by guests have included digital locks with keypad and other electronic identification means to provide access to the hotel guest. In some cases, the guest is able to select his/her own combination for the lock and in others the guest is issued a pre-selected number or some electronic identification means used as the "key" for the lock device.

The following U.S. patents are believed to have some relevance to this invention: U.S. Pat. Nos. 5,886,644, 5,894,277 and 6,655,180, all of which are incorporated by reference herein.

There has been a need for a battery-powered electro mechanical lock operated by an electronic identification means of relatively inexpensive construction, with manager or attendant override and with provision for efficient access in a low-battery state.

SUMMARY OF THE INVENTION

The invention now described applies to locker locks and similar lock situations, with the electronic lock itself being similar to those described in the three patents referenced above and incorporated by reference. The '180 patent describes a manager key slot in an electronic locker lock that is normally opened using a PIN number entered into a keypad. That manager key slot, as described in the patent, is to receive a small key held by a manager, the key comprising a circuit board with traces connected to an ibutton, so that a manager can insert a key to open the locker without the need to enter a manager PIN code on the keypad. The '644 and '277 patents describe locker locks with jumper contacts available from the front of the lock, to allow a lock to be "jumped" with outside power when the lock battery is too low to open the lock. The application of "jump" power could be accomplished using a dedicated device having contacts arranged to align with and touch the jumper contacts on the lock body. In a situation where a particular lock would have a dead battery and the last assigned PIN code was also unknown or forgotten (as in an exercise club with many lockers), the manager key arrangement of the '180, even if it were provided with power jumping contacts as disclosed in the '644 and '277 patents, would provide for a cumbersome situation where the manager would have to apply and maintain jump contact between the contacts on the lock and the jumper device, while also making contact with the special access or manager key.

In the invention an electronic lock device of the type disclosed in U.S. Pat. No. 6,655,180, for lockers or similar uses, has an input for a user code (keypad or electronic key reader), and a separate input for a manager key. Contacts at the manager key include power jumper contacts, so that when a user is unable to open his assigned locker, whether this is due to a low battery in the lock or failure of the user's key or the user's forgetting a PIN code, the manager key device will open the lock.

The lock of the invention can typically be used on locker locks for day use or long-term assigned use, on cabinets with battery-powered locks, usually in a system including a number of such locks, on drug carts and drug cabinets in hospitals, and on computer-enclosing cabinets for securing access to computers that may have sensitive information such as patient records at hospitals. Any battery-powered lock that is electronically accessed, where a user chooses or is assigned a PIN code or an electronic key that could be lost, can advantageously employ the principles of the invention, with convenience, economy and security. These and other objects, advantages and features of the invention will be apparent from the following description of preferred embodiments, considered along with the accompanying drawings.

DESCRIPTION OF THE DRAWINGS

FIG. 5 is a view showing another embodiment of a lock device, again with an input for a manager's key according to the invention.

FIG. 6 is a perspective view showing the manager's key in the lock of the second embodiment.

DESCRIPTION OF PREFERRED EMBODIMENTS

Figure 1:
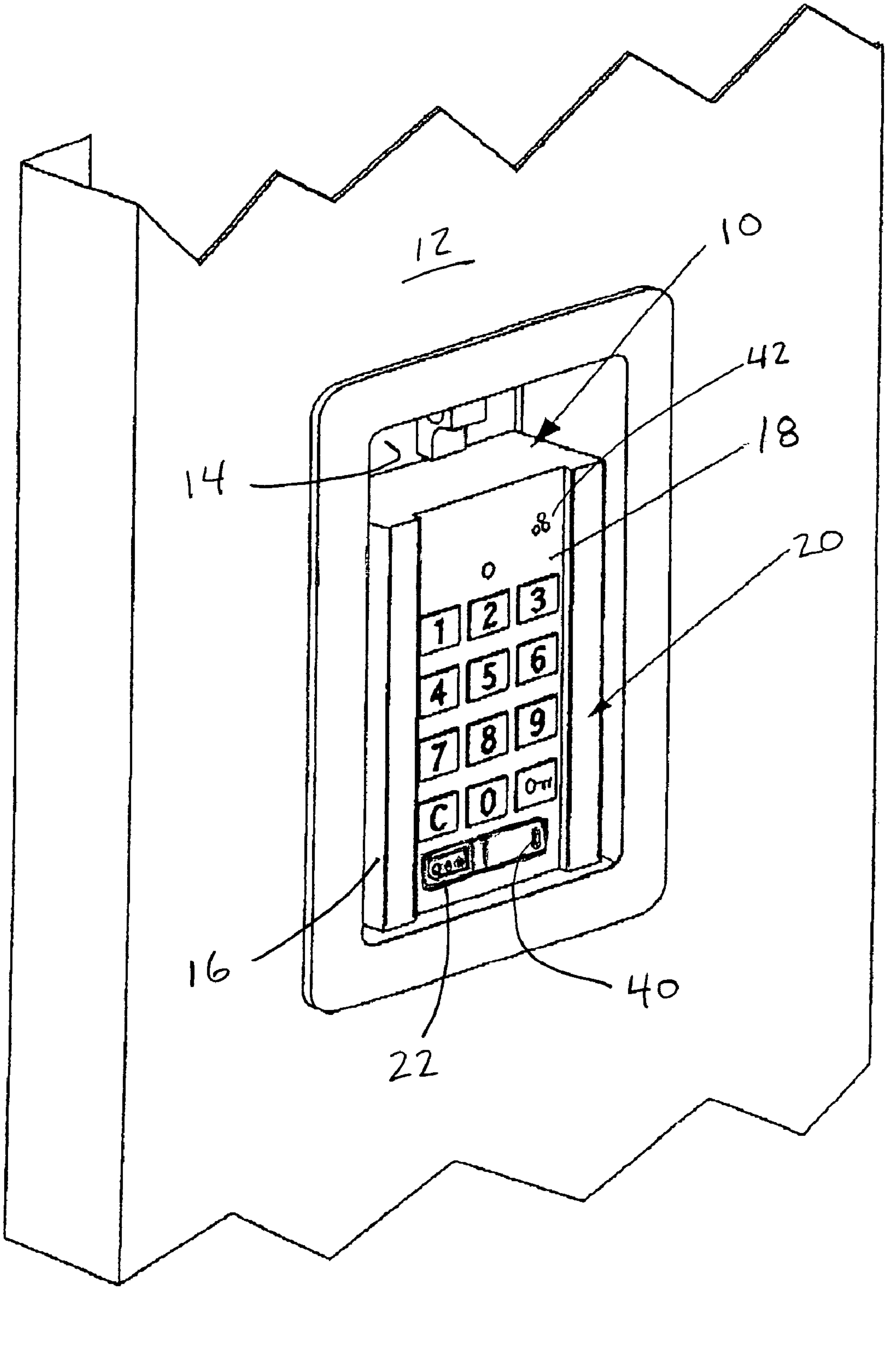
FIG. 1 is a perspective view showing a locker with a lock device of the invention, including an input for a manager's or attendant's key.

In the drawings, FIG. 1 shows a lock device 10 according to the invention, incorporated in a locker door or cabinet door 12 of which a portion is illustrated. The door 12 has a recessed lock mounting 14, within which the electronic lock 10 is secured. As discussed in the patents referenced above, the illustrated door can have a standard three-hole door prep, and the electronic lock 10 of the invention can be configured so as to fit in such a standard door prep and, as in the above patents, the lock 10 has not only the outer housing 16 seen in FIG. 1, but also an inner housing which is mounted on the inside of the door and secured through the door to the outer housing 16.

In the present invention in this particular embodiment the front face 18 of the electronic lock device 10 has a keypad 20 for entry of PIN codes, as discussed in the above referenced patents. Pursuant to the invention the front housing 16 of the electronic lock 10 also has an input or terminal 22 which functions to receive a manager's or attendant's special access key (in lieu of the manager's key slot 41 shown in the '180 patent). This input or terminal or port 22 also serves to receive a power jump when the battery powering the lock device 10 is too low to retract the bolt or latch. As shown in FIG. 1 and also in FIG. 2, three contacts 23, 24 and 25 are included, which are sufficient to pick up power from a power jump device using two of the contacts (a common and a power contact), and to communicate with the lock via the manager's device using two of the contacts (the common and a data contact). The terminal or port 22 preferably has a protective wall or collar 26, with the contacts 23-25 recessed inwardly, so as to protect those contacts.

Figure 2:
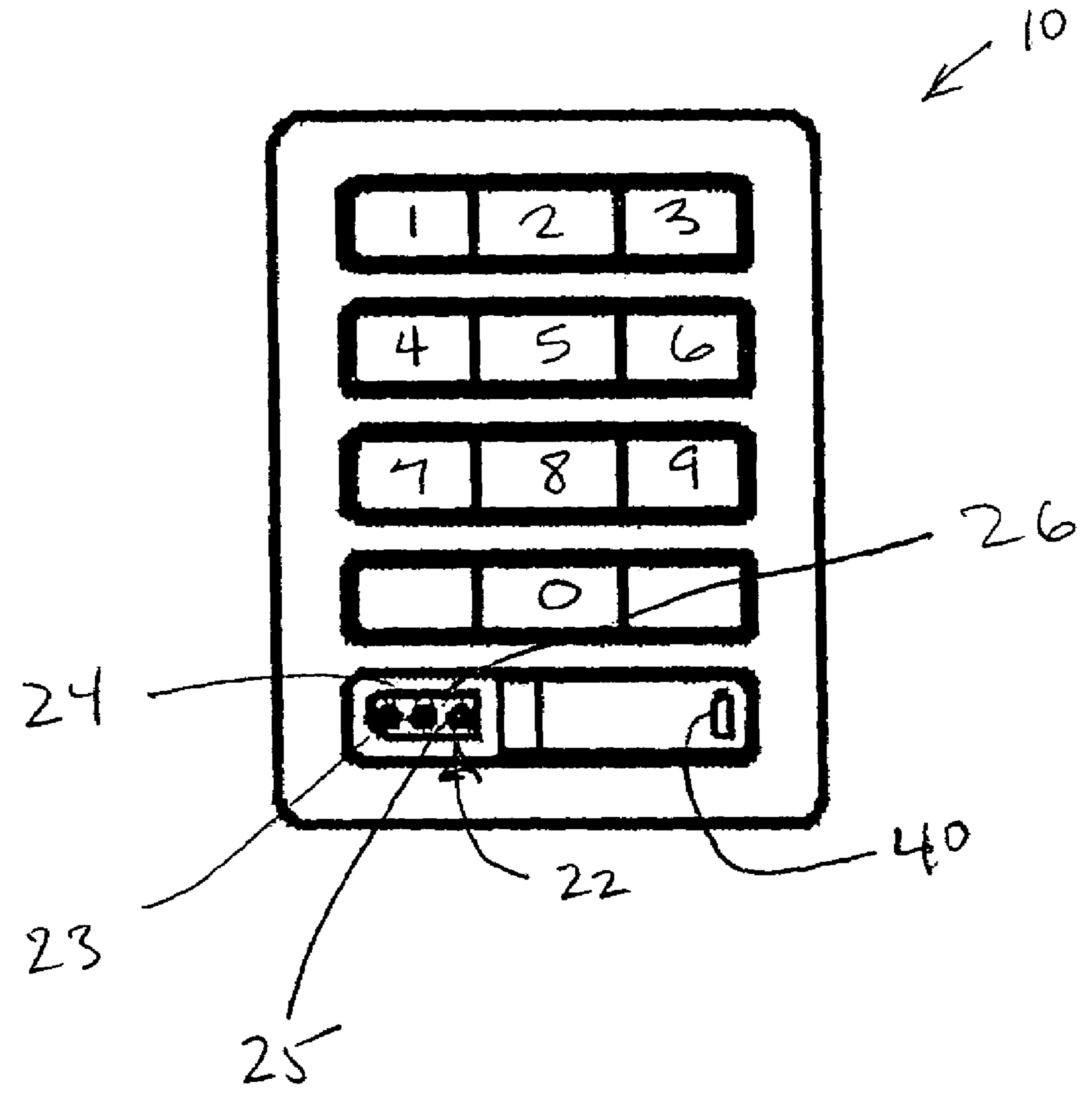
FIG. 2 is a frontal view of the lock device of FIG. 1.
Figure 3:
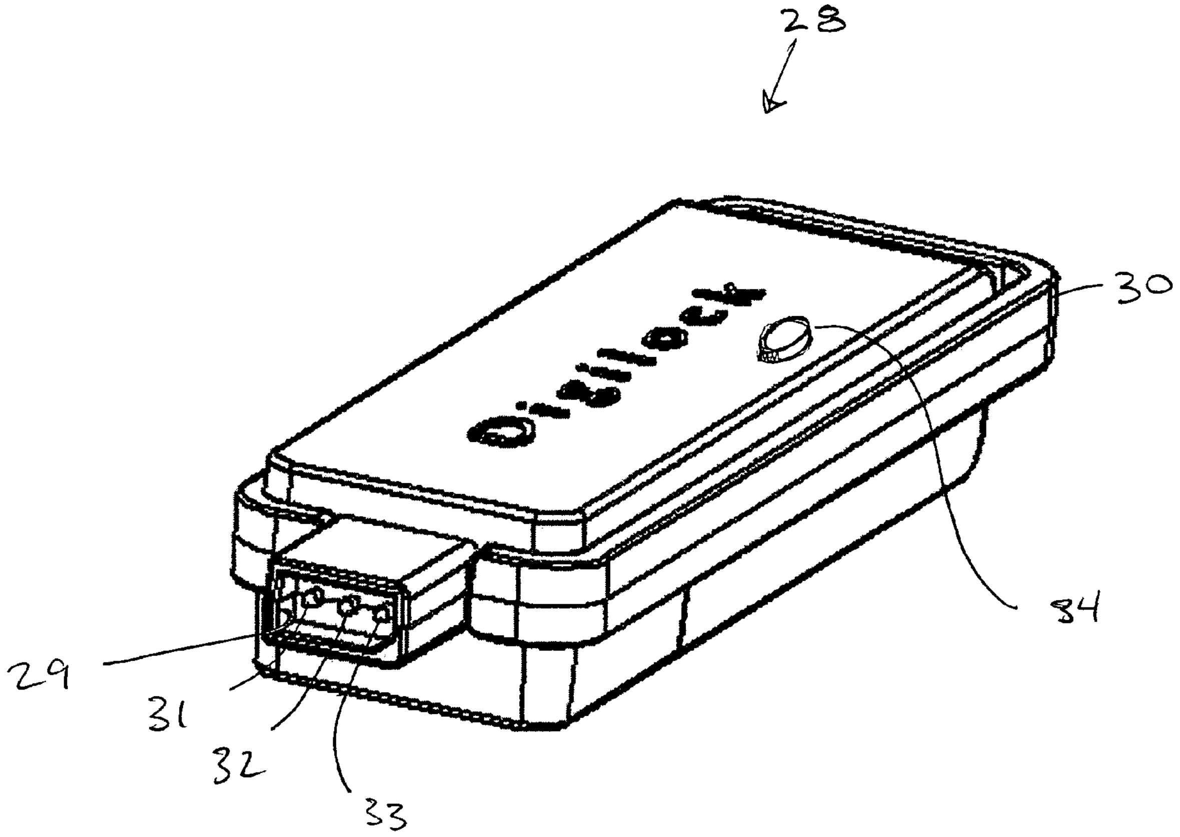
FIG. 3 is a perspective view of a manager's key to access the lock device of FIGS. 1 and 2.

FIG. 3 shows a manager's or attendant's special access device 28 for use with the lock device 10 of FIGS. 1 and 2. The casing or housing 30 of the special access device 28 contains a jump battery (which can be a rechargeable battery which is recharged using two of the three contacts 31, 32 and 33 on the end of the accessing device 28), and circuitry capable of storing a master ID code or access code, and that communicates with the lock terminal 22 using two of the contacts 31, 32 and 33. These contacts can be spring-biased contacts or plug-in type contacts, with the contacts 23-25 being sockets in the case of a plug-in arrangement. As shown, the device 28 preferably has a wall or collar 29 surrounding the contacts 31-33, so that the wall 29 closely fits over the wall 26 of the lock 10, with a complementary shape to assure current orientation in engagement. The pins 31-33 are recessed inwardly of the wall 29.

Figure 4:
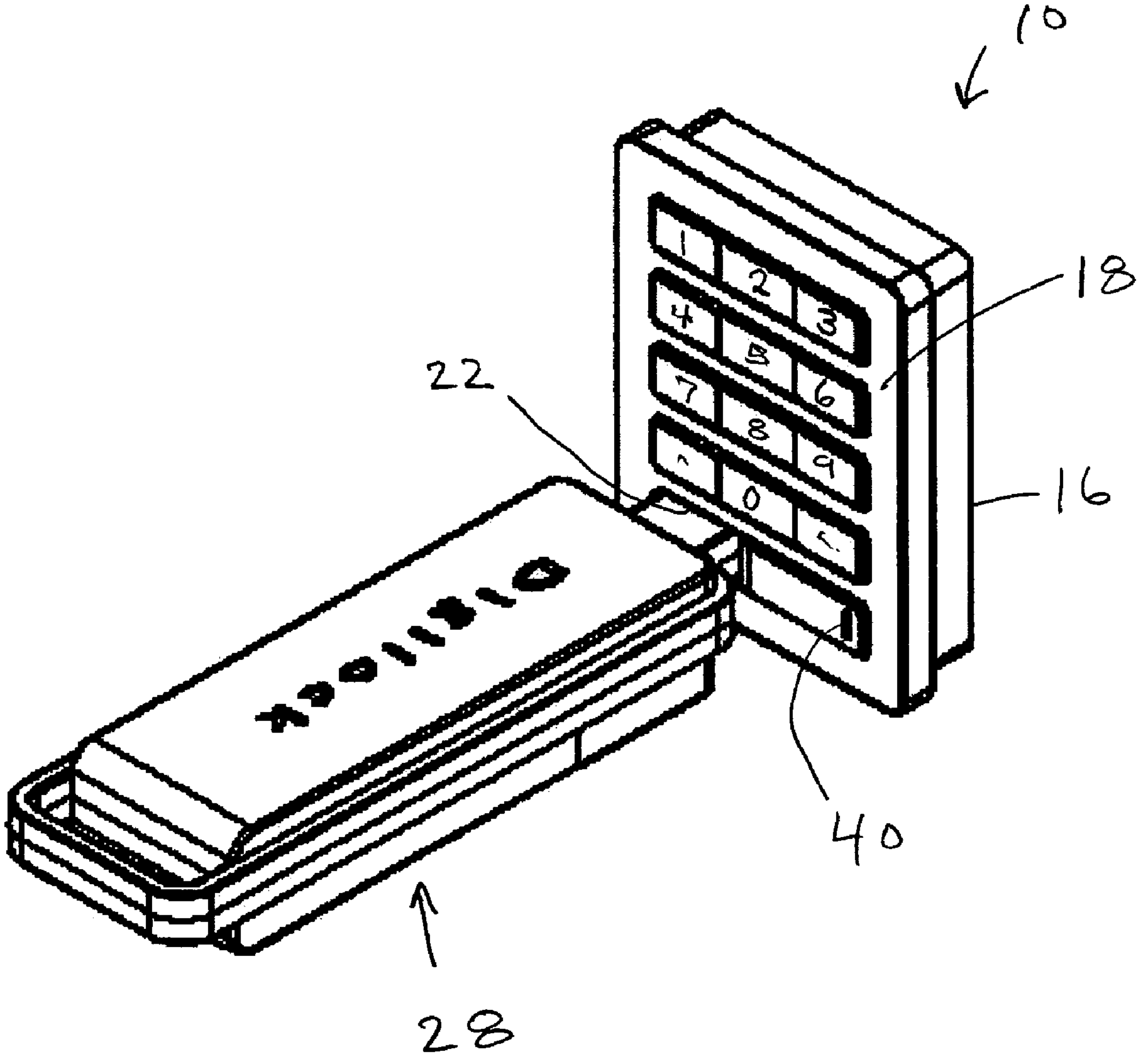
FIG. 4 is a perspective view showing the manager's key in the lock.

The internal circuitry of the special access device 28 has an overriding unlock code for all locks 10 in the system, communicated via two of the contacts to the lock when the device 28 is pushed against or plugged into the lock as shown in FIG. 4. At the same time, the battery of the special access device 28 will provide "jump" power to the lock 10. If desired, the casing 30 can have an external switch 34, such as a momentary switch, to switch on the power jumping function only when needed, and not when the only problem is a lost electronic code. However, this is not necessary, since the jumping of power when not needed does not cause any problem. Moreover, it does provide protection against shorting of the power pins against metal when carried in a user's pocket.

FIGS. 5 and 6 show the second embodiment wherein the lock 10*a* has an electronic reader receptacle 38, such as shown in U.S. Pat. No. 6,655,180 referenced above. This type of lock is accessed by an electronic key such as a device having an ibutton or other small memory device, or another type of electronic including a proximity device where contact is not needed. If the user, which can be temporarily assigned user, loses the key having a specific code signal for accessing lock 10*a*, the lock can be accessed by a manager or attendant. Similarly, the lock may have a low battery, with insufficient power to retract the bolt or latch, the special access key or device 28, when put in contact with the terminal 22 of the lock, will provide auxiliary power to "jump" the lock and allow it to open. In FIGS. 4-6 only the front housing of the lock device is shown, with the back housing or inner housing, not seen in these drawings, having the battery. Accessing of the lock is necessary in order to change the battery.

The drawings also illustrate a status indicator 40 which may be included on the front panels 18 and 18*a* of the lock devices. The status indicator 40 will be illuminated, such as with green, red, or yellow LED lighting, when a correct code has been entered, or when a wrong code has been entered or during programming. When the battery in either of the locks 10 or 10*a* is low, and the correct code is entered (via PIN or electronic key), the lock will emit an audible beep (e.g., two strings of three beeps each), indicating the battery low condition. This can be via a small speaker such as shown at 42 in FIG. 1.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In combination with a locker for temporary storage of a user's articles, the locker having a door and a movable bolt or latch positioned to secure the door when in extended position and to unlock the door when moved to a retracted position, an electronic lock for controlling the bolt or latch, comprising:

an inner housing and an outer housing, the inner housing being secured at the inside of the door and the outer housing being secured at a directly opposed position on the outside of the door such that the door is sandwiched between the two housings, with an electrical connection connecting the inner housing to the outer housing, through an opening in the door, electronic access means in the outer housing, for receiving a user's access code input by a user, an electrically operated drive mechanism connected to the bolt or latch so as to control the position of the bolt or latch, microcontroller means connected between the electronic access means and the electrically operated drive mechanism, for changing the position of the bolt or latch when a preselected access code is received by the electronic access means, a battery in one of the housings, connected to supply power to the electronic lock, and the outer housing further including a terminal with electrical contacts for the combined functions of receiving jump power for a low battery condition and receiving an override access code which will access the lock without the user's access code, whereby a special access device can be engaged with the terminal to provide power and an override access code simultaneously, to open the lock when the lock's battery is low or when the user's access code is lost or forgotten, or both.

2. A lock unit, comprising:

a housing, a bolt or latch connected to the housing and slidable between extended and retracted positions, an electrically operated drive mechanism connected to the bolt or latch in the housing, a source of power for the electrically operated drive mechanism, control means for connecting power to the electrically operated drive mechanism when the lock unit is properly accessed, to retract the bolt or latch to a retracted bolt position, when the unit is to be in an unlocked mode, and a lock accessing device connected to the control means and at a front of the lock unit, including a keypad for input of a user's code to set or to access the lock, and the front of the lock unit further including a terminal with electrical contacts for the combined functions of receiving jump power for a low battery condition and receiving an override access code which will access the lock without the user's access code, whereby a special access device can be engaged with the terminal to provide power and an override access code simultaneously, to open the lock when the lock's battery is low or when the user's access code is forgotten, or both.

3. The lock unit of claim 2, wherein said terminal includes a protective wall surrounding the electrical contacts and extending outwardly from the lock accessing device such that the electrical contacts are recessed inwardly from an outer edge of the protective wall.

4. In combination with the lock unit of claim 2, a special access device for use by a manager or attendant, the special access device having mating electrical contacts for connection to the electrical contacts on the lock unit, and the access device further including an internal battery to provide jump power to the lock unit, and circuitry storing an override access code capable of accessing a plurality of locks, when the access device is engaged with the terminal and in data communication with the lock via said contacts.

5. The combination defined in claim 4, wherein the special access device has a momentary switch for switching on battery power of the access device to provide jump power to the lock unit only when needed.

6. The combination defined in claim 4, wherein said mating electrical contacts on the special access device are surrounded by a protective collar protruding outwardly such that the mating electrical contacts are recessed inwardly relative to an outer edge of the protective collar, so that the electrical contacts are protected against contact with metal objects.

7. The combination defined in claim 6, wherein the terminal on the lock unit further includes a protective wall or collar surrounding the electrical contacts and extending outwardly from the lock unit, so that the electrical contacts of the lock unit are recessed inwardly of an outer edge of the protective wall or collar, and the collars of the access device and of the lock unit being sized such that one of the collars fits closely over the other when the access device is engaged with the terminal to make contact between the electrical contacts.

8. A lock unit, comprising:

a housing, a bolt or latch connected to the housing and slidable between extended and retracted positions, an electrically operated drive mechanism connected to the bolt or latch in the housing, a source of power for the electrically operated drive mechanism, control means for connecting power to the electrically operated drive mechanism when the lock unit is properly accessed, to retract the bolt or latch to a retracted bolt position, when the unit is to be in an unlocked mode, a lock accessing device connected to the control means and at a front of the lock unit, including an electronic access means for receiving a user's access code input by a user, and the lock unit further including a terminal with electrical contacts for the combined functions of receiving jump power for a low battery condition and receiving an override access code which will access the lock without the user's access code, whereby a special access device can be engaged with the terminal to provide power and an override access code simultaneously, to open the lock when the lock's battery is low or when the user's access code is lost or forgotten, or both.

9. The lock unit of claim 8, wherein said terminal includes a protective wall surrounding the electrical contacts and extending outwardly from the lock accessing device such that the electrical contacts are recessed inwardly from an outer edge of the protective wall.

10. In combination with the lock unit of claim 8, a special access device for use by a manager or attendant, the special access device including an internal battery to provide jump power to the lock unit and circuitry storing an override access code capable of accessing a plurality of locks, when the access device is engaged with the terminal and in data communication with the lock via said contacts.

11. The combination defined in claim 10, wherein the special access device has a momentary switch for switching on battery power of the access device to provide jump power to the lock unit only when needed.

12. The combination defined in claim 10, wherein said mating electrical contacts on the special access device are surrounded by a protective collar protruding outwardly such that the mating electrical contacts are recessed inwardly relative to an outer edge of the protective collar so that the electrical contacts are protected against contact with metal objects.

13. The combination defined in claim 12, wherein the terminal on the lock unit further includes a collar or wall surrounding the electrical contacts and extending outwardly so that the electrical contacts of the lock unit are recessed inwardly of an outer edge of the protective wall or collar, and the collars of the access device and of the lock unit being sized such that one of the collars fits closely over the other when the access device is engaged to make contact between the electrical contacts.

14. The lock unit of claim 8, wherein the electronic access means includes a keypad for manual entry of a PIN code.

15. The lock unit of claim 8, wherein the electronic access means includes a touch memory device.

* * * * *